Patented Jan. 29, 1952

2,583,891

UNITED STATES PATENT OFFICE 2,583,891

QUANTITATIVE DETERMINATION OF METALS

Gerold Schwarzenbach, Zurich, Switzerland, assignor to Chemische Fabrik Uetikon (Uetikon Chemical Company), Uetikon, Switzerland, a firm No Drawing. Original application April 8, 1946, Serial No. 660,408. Divided and this application November 13, 1950, Serial No. 195,473. In Switzerland May 2, 1945

10 Claims. (Cl. 23—230)

For the quantitative determination of numerous metals and, especially, of the alkaline-earth metals, at the present time only gravimetric and indirect titrimetric methods are available. Thus, for example, for the determination of the total hardness of a natural water by the standard method, a sample thereof is treated with an excess of a standard solution of sodium carbonate and sodium hydroxide, in order to precipitate the calcium as carbonate. This is effected either by evaporating the mixture to dryness or letting it stand for a day. In the former case it is taken up in distilled water. The whole is then filtered and the filtrate is titrated back with hydrochloric acid of known strength. The total hardness can be calculated from the volumes of the sample of water employed, the added solution of sodium carbonate and sodium hydroxide and the hydrochloric acid needed for the back titration. This method is very complicated and tedious. In addition, the result is obtained as a difference between two comparatively large figures and therefore lacks accuracy. The other known methods for determining the total hardness are either similarly troublesome or are suitable only for approximate determination of hardness as, for example, in the case of Blacher's method in which a soap solution is employed.

It has now been found that the total hardness of any water can be determined in a particularly simple and reliable manner by adjusting to the same pH value a sample of the water and a solution of an amino polycarboxylic acid compound containing in relation to one basic nitrogen atom more than one carboxymethyl group attached directly thereto, said compound being capable of sequestering calcium in complex form, mixing with the sample of water an amount of the solution of amino polycarboxylic acid compound at least sufficient to sequester in soluble complex form the metal cations such as calcium and magnesium responsible for water hardness, and then adding progressively a standard alkaline solution until the pH value of the mixture is restored to the value to which the water sample and the solution of amino polycarboxylic acid compound were initially adjusted.

It should be here pointed out that the hydrogen which is associated with the amino carboxylic compound is fairly tightly held and contributes virtually no acidity to the aqueous solution in which the amino carboxylic acid compound is employed. When the solution is added to the water sample, and the metal ions react with the amino carboxylic acid compound, this hydrogen is displaced and becomes an active hydrogen ion and thereby produces a proportionate drop in the pH value of the final solution. Consequently, by titrating the solution with a standard alkaline solution such as dilute sodium hydroxide solution, until the pH value of the sample is restored to its original adjusted value which existed prior to the addition of the complex-forming amino polycarboxylic acid compound, the volume of alkali solution required to neutralize the liberated acid represents the equivalent of hardness present in the water sample.

The pH adjustment of the original water sample and that of the amino polycarboxylic acid compound may be readily effected either electrometrically or more simply with the aid of one of the well-known acid-base colorimetric indicators, for example methyl orange, methyl red, phenolphthalein, etc.

In addition to calcium, the other alkaline-earth metals, and also lithium, aluminum, the rare-earth metals, zinc, cadmium, mercury, lead, copper, iron, cobalt, nickel, and manganese can be quantitatively determined by the same method. Especially suitable as complex-forming compounds are the aminopolycarboxylic acids of the general formula

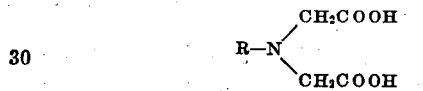

wherein R stands for a member selected from the group consisting of hydrogen and the radicals —CH2COOH,

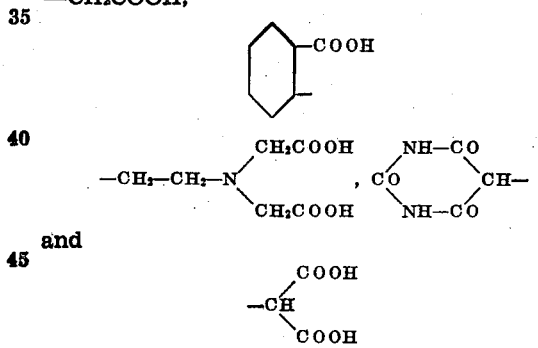

and

Imidodiacetic acid, nitrilotriacetic acid, anthranilic-acid-diacetic acid, ethylenediamine-tetracetic acid, examples within the general formula, have long been known, whilst aminomalonic-acid-diacetic acid and uramildiacetic acid have recently been prepared by me (Helvetica chimica acta 28, 1141 (1945); 29, 368 (1946). The followare suitable as complex-forming compounds: e salts of imidodiacetic acid, and of its deriva- :s, for example, nitrilotriacetic acid, anthra- ic-acid-diacetic acid, ethylenediamine-tetra- ic acid and especially of uramildiacetic acid i aminomalonic-acid-diacetic acid. The lat- two compounds have hitherto been unknown.

addition to the sample of one of the com- mds just mentioned, a complex ion containing : metal being determined is formed. The metal s are no longer present in their original state ; are sequestered or locked up in the complex. ncurrently there is liberated an amount of acid tivalent to the metal which is sequestered, the d becoming free and titratable as previously )lained.

\part from its simplicity and reliability, the portance of the new method lies in the fact .t it enables a considerable number of metals be titrated with the same standard alkaline ition as that used for the usual alkalimetric ations. No special chemicals or apparatus necessary for these determinations in addi- 1 to the complex-forming substances men- ned. Also, some of the complex-forming com- mds are easily obtainable in an excellently stalline form and in a condition of absolute ity and are therefore pre-eminently suitable substances for titrimetric standards with the of which the alkaline and all other standard itions are readily adjustable. The accuracy of : metal determinations is increased by the em- yment of such adjusted standard alkaline so- ions. As a modification of the method out- d above, instead of adding a standard alkali ition and titrating with the aid of one of the d-base colorimetric indicators mentioned, any : of a number of colorimetric indicators par- ilarly suitable for determination of pH may added to a solution, for example, containing ter sample and complex-forming compound. e choice of indicator will be dependent upon : pH range in which the analysis is being con- :ted. In this alternative method, pH value both sample and complex-forming solution are viously adjusted to identical level. When the licator is added and thoroughly mixed with : aqueous solution, the indicator responds im- diately by changing color. The color of the icator represents a certain pH value or hy- gen-ion concentration which is readily as- tainable by comparison of the solution with a or scale of known values. The pH value may ) be measured by electrometric means. The rease of pH value due to liberation of acid on addition of complex-former to the water nple is a measure of the total hardness pres- : in the water sample.

"or these determinations of metals, there is /antageously selected from the complex-form- compounds mentioned a compound having an ilibrium constant of formation of the com- x with the metal to be determined which is large as possible and amounts to, at least, 100.

Examples

\ natural water, the calcium content of which, :ording to the known standard method here- efore mentioned, amounted to 24.4 French de- es, was to be analyzed. A sample measuring ) cc. was, after the addition of methyl red, ught to a pH value of 5 with the addition of 2N hydrochloric acid. Incidentally, the num- · of cc. required for this purpose, divided by 2, es the temporary hardness. After treatment with 10 cc. of a solution, which contained 20 gms. of uramildiacetic acid per liter, neutralized to a pH value of 5, the solution, which became acid, was titrated with 0.02N caustic soda solution un- til the color of the solution was the same shade of color as that of the original water sample after addition of methyl red and the 0.02N hydro- chloric acid. 24.3 cc. were required, correspond- ing to a total hardness of 24.3 French degrees. Instead of methyl red, bromocresol purple can be employed with the same success.

If ethylenediamine-tetracetic acid is employed instead of uramildiacetic acid, twice the amount of 0.02N caustic soda solution is required, so that the number of cc. of standard solution run in is to be divided by 2 to obtain the total hard- ness in French degrees. Thus, 200 cc. of the same water, after adjustment to a pH value of 5 and subsequent addition of a solution of ethyl- enediamine-tetracetic acid, the pH value of which also amounted to 5, required 49.0 cc. of 0.02N caustic soda solution, corresponding to a hardness of 24.5 French degrees.

The following are the formulae of the acids hereinbefore mentioned from which the complex- forming salts are produced:

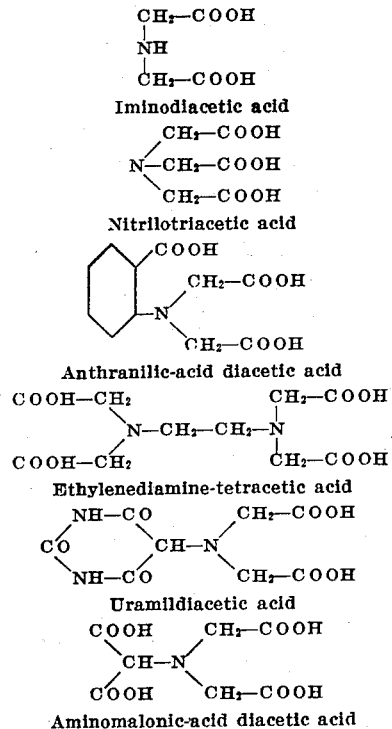

This is a division of my co-pending applica- tion, Serial No. 660,408 filed April 8, 1946.

I claim:

1. A method of volumetrically determining metal cations in solution which comprises mix- ing a measured volume of the solution contain- ing the metal cations and a solution containing an amino polycarboxylic acid compound in at least an amount sufficient to sequester all of the aforesaid metal cations, said compound having in relation to one basic nitrogen atom more than one carboxymethyl group directly attached there- to, the pH value of both solutions having been previously adjusted to the same level, titrating the resultant solution mixture with an alkaline solution of known strength in sufficient amount to restore the pH value of the resultant solution mixture to that of the original solutions immediately prior to the mixing thereof, the amount of alkaline solution being a direct measure of the amount of the aforesaid metal cations present in the original solution.

2. A method according to claim 1 in which the amino polycarboxylic acid has the general formula

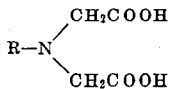

where R is a member selected from the group consisting of hydrogen and the radicals

—CH₂COOH

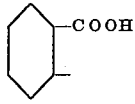

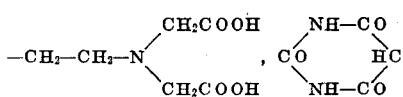

and

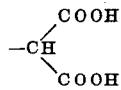

3. A method according to claim 1 in which the amino polycarboxylic acid compound is a salt of ethylenediamine tetra acetic acid.

4. A method according to claim 1 in which the amino polycarboxylic acid compound is a salt of uramildiacetic acid.

5. A method according to claim 1 in which the amino polycarboxylic acid compound is a salt of nitrilotriacetic acid.

6. A method of determining metal cations in solution which comprises mixing a measured volume of the solution containing the metal cations and a solution containing an amino polycarboxylic acid compound in at least an amount sufficient to sequester all of the aforesaid metal cations, said compound having in relation to one basic nitrogen atom more than one carboxymethyl group directly attached thereto, the pH value of both solutions having been previously adjusted to the same level, and determining by a suitable indicating means the resultant pH value of the final solution, the change in pH between the value after adjustment and that of the final solution being a direct measure of the amount of the aforesaid metal cations present in solution.

7. A method according to claim 6 in which the amino polycarboxylic acid has the general formula

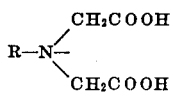

where R is a member selected from the group consisting of hydrogen and the radicals —CH₂COOH,

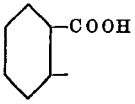

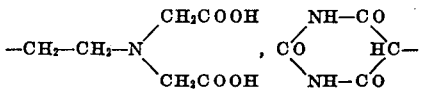

and

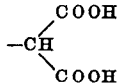

8. A method according to claim 6 in which the amino polycarboxylic acid compound is a salt of ethylene diamine tetra acetic acid.

9. A method according to claim 6 in which the amino polycarboxylic acid compound is a salt of uramildiacetic acid.

10. A method according to claim 6 in which the amino polycarboxylic acid compound is a salt of nitrilotriacetic acid.

GEROLD SCHWARZENBACH.

REFERENCES CITED

The following references are of record in the file of this patent:

UNITED STATES PATENTS

| Number | Name | Date |
|---|---|---|
| 699,581 | Seidel | May 6, 1902 |
| 1,405,940 | Rice | Feb. 7, 1922 |
| 2,130,505 | Munz | Sept. 20, 1938 |
| 2,168,181 | Ulrich et al. | Aug. 1, 1939 |
| 2,240,957 | Munz | May 6, 1944 |
| 2,348,984 | Lehman et al. | May 16, 1944 |
| 2,428,353 | Bersworth | Oct. 7, 194' |

FOREIGN PATENTS

| Number | Country | Date |
|---|---|---|
| 490,384 | Great Britain | Aug. 15, 193t |

OTHER REFERENCES

Taylor and Baker: "Organic Chemistry of Nitrogen," page 122 (1942), Oxford Univ. Press.

Chem. and Met. Eng.: "Measurement and Control of pH," pages 553–560, August 1940.